(12) United States Patent
Sugama et al.

(10) Patent No.: US 6,751,393 B2
(45) Date of Patent: Jun. 15, 2004

(54) OPTICAL WIRING CONNECTION STRUCTURE ENABLING OPTICAL CROSS CONNECT UTILIZING CONTINUOUSLY EXTENDING THROUGH HOLES IN ORTHOGONALLY POSITIONED BOARDS

(75) Inventors: Akio Sugama, Kawasaki (JP); Masayuki Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 33 days.

(21) Appl. No.: 10/096,507

(22) Filed: Mar. 13, 2002

(65) Prior Publication Data

US 2003/0077061 A1 Apr. 24, 2003

(30) Foreign Application Priority Data

Oct. 22, 2001 (JP) .......................... 2001-323842

(51) Int. Cl.[7] ................................................. G02B 6/00
(52) U.S. Cl. ........................................ 385/134; 385/137
(58) Field of Search ............................... 385/134, 137, 385/81, 83, 46

(56) References Cited

U.S. PATENT DOCUMENTS

| 4,943,136 | A | * | 7/1990 | Popoff ........................ 385/46 |
| 5,461,684 | A | * | 10/1995 | Vinchant et al. ............... 385/22 |
| 6,062,740 | A | * | 5/2000 | Ohtsuka et al. ................ 385/81 |
| 6,398,424 | B1 | * | 6/2002 | Jin et al. ...................... 385/83 |
| 6,442,322 | B1 | * | 8/2002 | Chen et al. .................. 385/137 |
| 6,464,404 | B1 | * | 10/2002 | Robinson et al. ............. 385/54 |

FOREIGN PATENT DOCUMENTS

| JP | 6-31910 | 2/1994 |
| JP | 10-243424 | 9/1998 |
| JP | 11-178078 | 7/1999 |

* cited by examiner

Primary Examiner—Chandrika Prasad
(74) Attorney, Agent, or Firm—Armstrong, Kratz, Quintos, Hanson & Brooks, LLP

(57) ABSTRACT

An optical wiring connection structure includes a board that has a first end and a second end. A plurality of through-holes continuously extend from the first end to the second end in the board. An optical wire is provided in each of the through-holes so as to extend continuously from the first end to the second end. An optical connector is connected with each optical wire extending from the first end of the board.

12 Claims, 7 Drawing Sheets

OPTICAL WIRING CONNECTION STRUCTURE ENABLING OPTICAL CROSS CONNECT UTILIZING CONTINUOUSLY EXTENDING THROUGH HOLES IN ORTHOGONALLY POSITIONED BOARDS

BACKGROUND OF THE INVENTION

1. Field of the Invention

The present invention generally relates to an optical communication apparatus and, more particularly, to an optical wiring connection structure of a signal or data transmission system used in an apparatus of an information.communication system which needs high-speed and large-capacity signal transmission.

The optical communication technology is widely used in a main communication system such as a long-distance transmission system since data can be transmitted at high speed by the optical communication technology. Especially, a technology called WDM (Wavelength Division Multiplexing) has been developed which transmits different information with a plurality of wavelengths through a single optical fiber simultaneously, and an information transmission with large capacity is realized.

A relay base in the main communication system station separates information sent by WDM into channel components of individual wavelengths, switches a destination of each channel component with a switch, and synthesizes a plurality of channel components into a single optical fiber signal on an individual destination basis. In order to perform such switching, it is necessary to switch a destination of an arbitrary channel component freely. More specifically, a cross connect function is necessary so as to output inputs of N channels as outputs of N channels.

In the future, in view of the progress in WDM technology, it is expected that it will be possible to send more than a hundred channel components through a single optical fiber. Therefore, there is a demand that the cross connect function have a capacity of handling more than a thousand channels.

2. Description of the Related Art

Such a multi-channel optical cross connect function may be achieved by a multistage optical switch such as that shown in FIG. 1.

Referring to FIG. 1, an optical fiber bundle $41_1$ is made up of a group of optical fibers $CH_1$ to $CH_M$, which carry optical signal components of channels 1 through M demultiplexed from a WDM signal, respectively. Each of the optical fiber bundles $41_2$ through $41_N$ is configured by a group of optical fibers, which transfer optical signal components demultiplexed from another WDM signal, respectively. The optical fiber bundle $41_1$ and the rest of optical fiber bundles are cross-connected at an optical cross connect part 43A. Each of the optical fiber bundles $41_1$ through $41_N$ has a corresponding optical connector switch $42_1$ through $42_N$. The optical connector switches $42_1$ through $42_N$ are cross-connected with output side optical connector switches $44_1$ through $44_N$ at the optical cross connect part 43A.

In the structure shown in FIG. 1, the output side optical connector switches $44_1$ through $44_N$ are connected with the output side optical connector switches $45_1$ through $45_N$ in the next stage by an optical cross connect part 43B. Output side optical fibers bundles $46_1$ through $46_N$ extend from the respective optical connectors $45_1$ through $45_N$.

The optical cross connect parts 43A and 43B can be realized by using a multitude of single-core optical fibers in the most simple way, as recited in Japanese Laid-Open Patent Application No. 06-31910. However, in such a structure, a very large space is needed so as to accommodate merely the optical fibers and optical connectors for each channel.

On the other hand, in Japanese Laid-Open Patent Application No. 11-178018, a structure is disclosed in which a board carrying an optical connector switch in the preceding stage and a board carrying an optical connector switch in the subsequent stage are orthogonal. In this way, by making the board of the preceding stage and the board of the subsequent stage cross at right angles, an arrangement of optical fibers at the optical cross connect parts 43A and 43B is simplified. However, even in such an optical connection structure, it is basically necessary to connect optical fibers one by one, thus workload is heavy and mistake-prone.

Additionally, in Japanese Laid-Open Patent Application No. 10-243424, a technology is disclosed in which a two-dimensional fiber array structured with N layers of optical fiber sheets each having M cores and a two-dimensional fiber array structured with M layers of optical fiber sheets each having N cores are crossed by orthogonal junction. According to such a structure, a compact cross construction can be realized. However, in order to prevent a coupling loss, it is necessary to stack the fiber sheets with a pitch accurately corresponding to the pitch between the cores. However, such a structure is difficult to manufacture.

Further, there is a method of using fiber sheet technology where optical fiber strands are laid along arbitrary lines and fixed by a resin or the like in a sheet-state. According to such a structure, since the optical fibers do not have protection films, a compact cross structure can be realized. However, as seen clearly from FIG. 1, optical fibers are concentrated and stacked at the center part of the cross structure. Optical fibers have tolerable minimum bending radiuses according to specifications. However, with such a structure, it is difficult to control a bending radius in a longitudinal direction caused by a pile of the optical fibers. For this reason, the performance characteristics of the optical fibers cannot be guaranteed.

SUMMARY OF THE INVENTION

It is a general object of the present invention to provide a novel and useful optical connection structure in which the above-mentioned problems are eliminated.

A more specific object of the present invention is to provide a compact and highly reliable optical wiring connection structure which can be easily manufactured.

The above-described object is achieved, according to one aspect of the present invention, by an optical wiring connection structure comprising a board that has a first end and a second end, a plurality of through-holes that continuously extend from the first end to the second end in the board, a plurality of optical wires each of which is provided in one of the through-holes, so as to extend continuously from the first end to the second end and an optical connector connected with each of the optical wires extending from the first end of the board.

The above-described object is also achieved, according to another aspect of the present invention, by an optical wiring connection structure comprising a first optical wiring connection part including a first board constituted by a plurality of substrates and having a first end and a second end, and a plurality of first through-holes continuously extending from the first end to the second end in each of a plurality of the first boards, a second optical wiring connection part including a second board constituted by a plurality of substrates and including a third end and a fourth end and positioned such that the third end connects with the second end of the first boards, a plurality of second through-holes continuously extending from the third end to the fourth end in each of a plurality of the second boards, a plurality of optical wires each of which is provided in a respective one of the first through-holes so as to extend from the first end to the second end, and further extend continuously in a respective one of the second through-holes corresponding to the first through-holes from the third end to the fourth end, a first optical connector that is provided to each of the substrates of the first board and connected with optical fibers extending from the first end and a second optical connector that is provided to each of the substrates of the second board and connected with second optical fibers extending from the fourth end, wherein the second board is positioned such that each board surface is orthogonal to each board surface of a plurality of the substrates of the first board, and the second board is provided such that each of the second through-holes corresponds to respective one of a plurality of the first through-holes exposed at the second end.

According to another aspect of the present invention, by using a board including through-holes as a first board, it is possible to change a pitch of the optical wires continuously from a first pitch corresponding to the optical connector to a second pitch corresponding to a thickness of the second board. Therefore, an optical cross connect using the optical wire is realized in the boundary surface between said second end and third end by stacking a multitude of said first boards so as to form a stacked material and to which stacked material connecting a stacked material which is structured by stacking the second boards. Such an optical wiring connection structure is sturdy, easy to manufacture and moreover, compact.

According to the present invention, an arbitrary three-dimensional optical wiring connection structure can be realized using optical fibers. The present invention is, since the optical fibers are held in grooves which function as guides, effective for preventing mistakes in laying the optical fibers. Additionally, since the optical fibers are protected in the grooves, it is possible to use optical fiber strands for optical wires. Therefore, the whole optical wiring connection structure can be further downsized compared to using optical fiber cables. Accordingly, the present invention has an advantage in providing an optical transmission of a large number of channels, for which especially downsizing is in great demand. Further, in the present invention, the optical fibers can be arranged according to a connector pitch so as to make connecting of the optical fibers easy.

Other objects, features and advantages of the present invention will become more apparent from the following detailed description when read in conjunction with the following drawings.

DETAILED DESCRIPTION OF THE PREFERRED EMBODIMENTS

Figure 1:
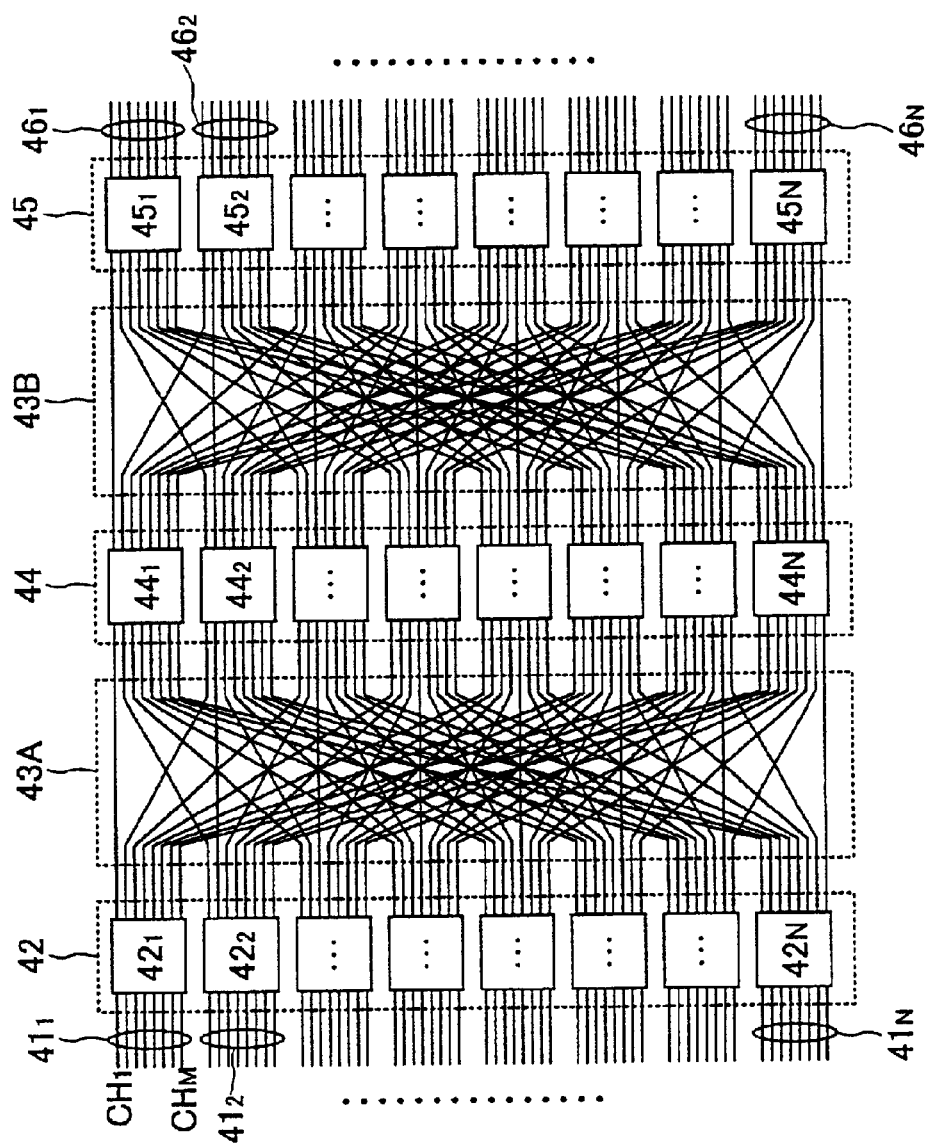
FIG. 1 is a diagram showing a configuration of a conventional multistage optical switch.
Figure 2:
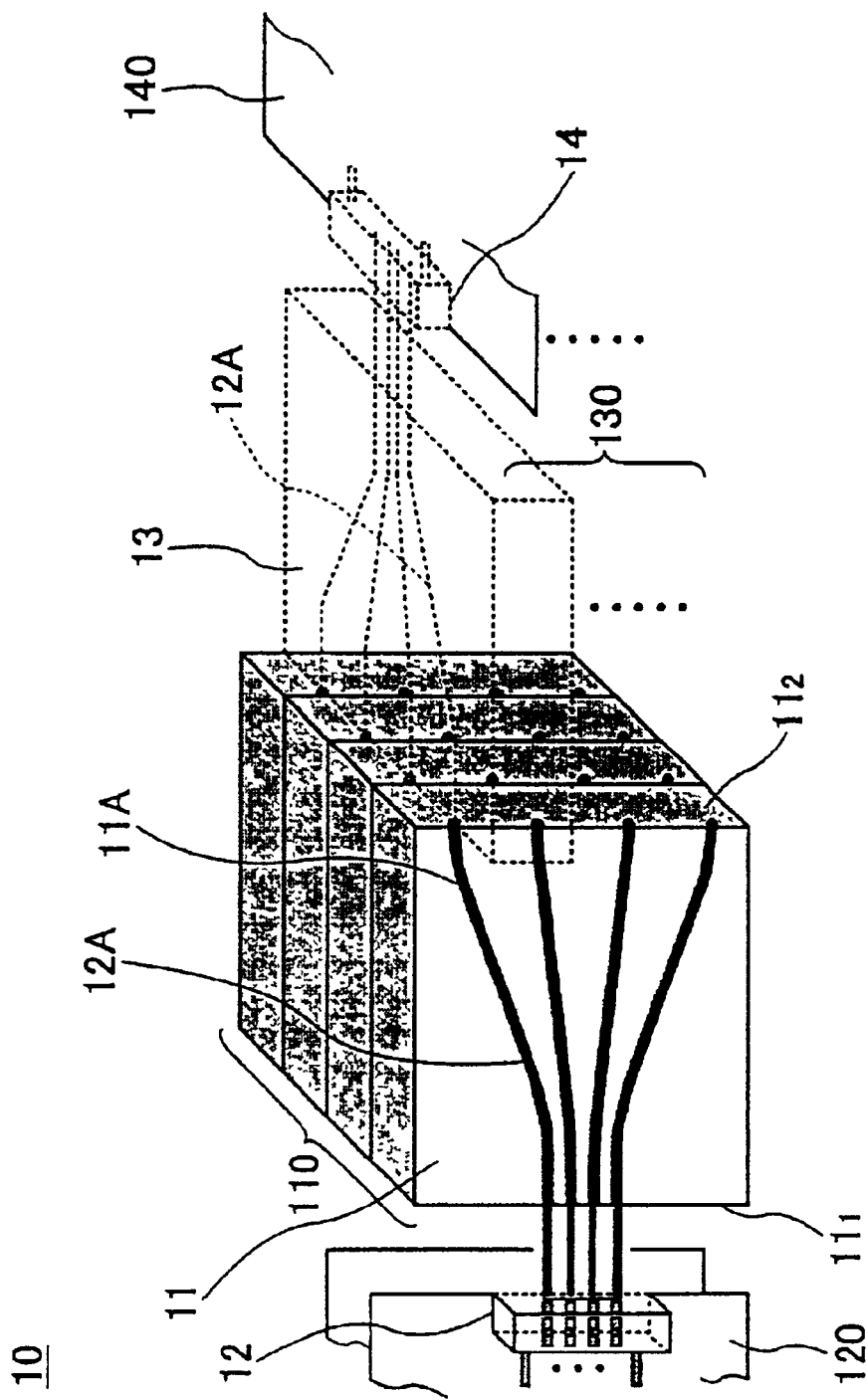
FIG. 2 is a diagram showing an optical wiring connection structure according to a first embodiment of the present invention.

FIG. 2 shows a general view of an optical wiring connection structure according to a first embodiment of the present invention.

Figure 3:
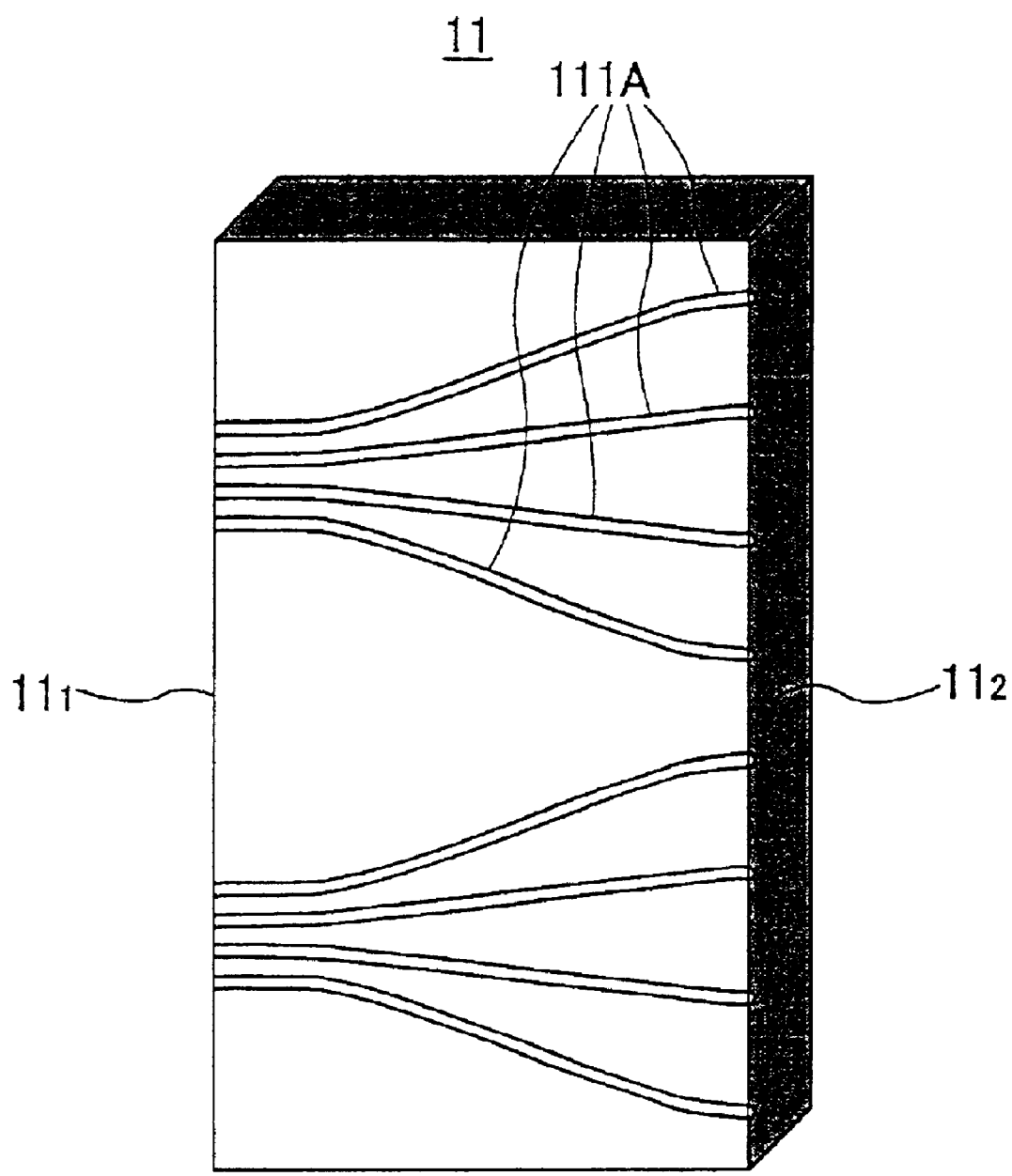
FIG. 3 is a diagram showing a part of the structure shown in FIG. 2.

Referring to FIG. 2, an optical wiring connection structure 10 includes stacked material (boards) 110 which is formed by stacking a plurality of substrates 11 one of which is shown in FIG. 3. On the substrate 11, a plurality of grooves are formed continuously from an end face $11_1$ to the other end face $11_2$ opposite to the end face $11_1$. To each of a plurality of the grooves 11A is laid an optical fiber strand (optical wire) 12A extending from an optical connector 12 such as a JIS-MT connector, and the optical fiber strands 12A are exposed from the end face $11_2$. The optical connector 12 may be provided at the tip of an optical flat cable or on a wiring board 120.

Further, at the end face $11_2$, stacked material 130 formed by stacking a plurality of substrates 13 that are similar to the substrate 11 is engaged. In each substrate 13, a plurality of grooves similar to the grooves 11A are formed from an end face engaged with the end face $11_2$ to the opposite end face, and the optical fiber strands 12A extend continuously in the grooves. Further, the optical fiber strands 12A extending from the substrate 13 are gathered at the optical connector 14. The stacked material 130 is provided on the stacked material 110 such that the optical fiber strands 12A extending from the end face $11_2$ are accepted in the grooves of the substrates 13.

By stacking a plurality of the substrates 11, each of a plurality of the grooves 11A forms through-holes in the stacked material 110. Similarly, in the stacked material 130, the grooves corresponding to the grooves 11A form through-holes although the illustration thereof is omitted. Each through-hole in the stacked material 110 and the each corresponding through-hole in the stacked material 130 together form a through-hole that continuously penetrates the stacked materials 110 and 130.

The grooves 11A are formed with a pitch of 0.25 mm, for example, which is equal to a pitch of the optical fibers at the end face $11_1$. On the other hand, at the opposite end face $11_2$, the grooves 11A are formed with a pitch of 3 mm, for example, which corresponds to a thickness of the substrate 13. Additionally, in the substrate 13, the grooves which accept the optical fibers 13A are formed with a pitch corresponding to a thickness of the substrate 13, 3 mm, for example, at the end face engaging with the end face $11_2$. On the other hand, at the opposite end face, the grooves in the substrate 13 are formed with a pitch corresponding to a pitch of the optical fibers in the optical connector 14 such as a JIS-MT connector, 0.25 mm, for example. The grooves 11A in the substrate 11 and the grooves (illustration thereof is omitted) in the substrate 13 have a width and a depth of 0.5 to 1 mm, for example.

Additionally, the pitch in the end face $11_1$ of the grooves 11A may be set equal to a pitch of a board 140 carrying the optical connector 14.

The substrates 11 and 13 may be formed of plastic, metal or ceramics. Additionally, the grooves 11A may be formed by a normal processing method which is suitable for the quality of the material such as injection molding and NC machining.

According to such a structure, it is possible to connect the input side optical connector 12 and the output side optical connector 14 with an arbitrary combination of optical fibers. Especially, by connecting the substrate 11 and the substrate 13 orthogonally as is shown in FIG. 2, it is possible to realize a three-dimensional optical fiber cross connect providing a tolerable radius of curvature of the optical fibers.

Figure 4:
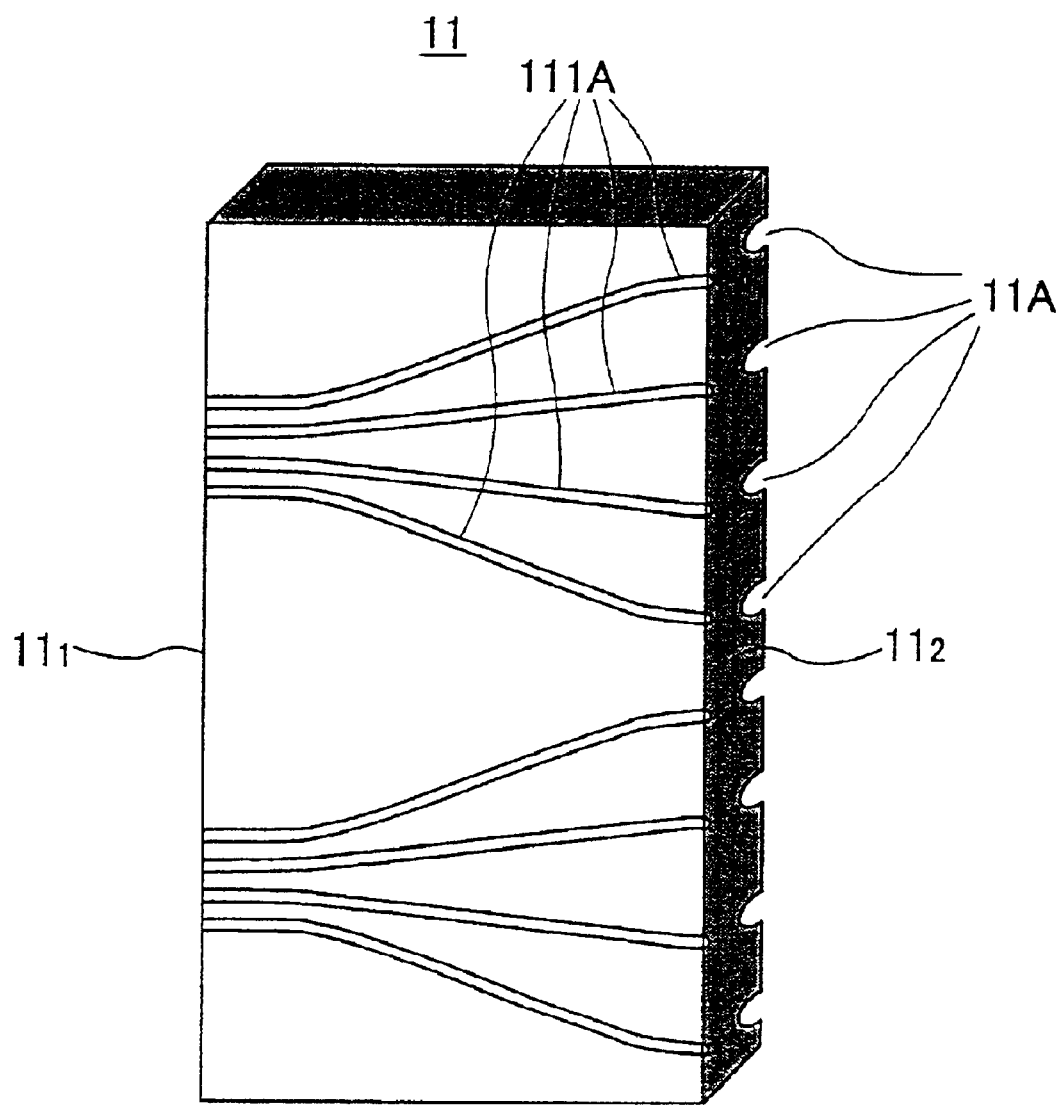
FIG. 4 is a diagram showing a variation of the structure shown in FIG. 2.

Further, as shown in a modification in FIG. 4, the grooves 11A may be formed on both sides of the substrate 11.

In this embodiment, optical fiber strands 12A are provided in the grooves, however, optical fiber cables in which preservative coatings are provided to optical fiber strands may also be used. From the point of view of miniaturizing the total size of the optical wiring connection structure, it is preferable to use optical fiber strands with a small diameter. In the present invention, even when using optical fibers which are mechanically fragile, it is possible to prevent generation of mechanical force since the optical fiber strands themselves are held in the stacked material 110 and 130.

[Second Embodiment]

Figure 5:
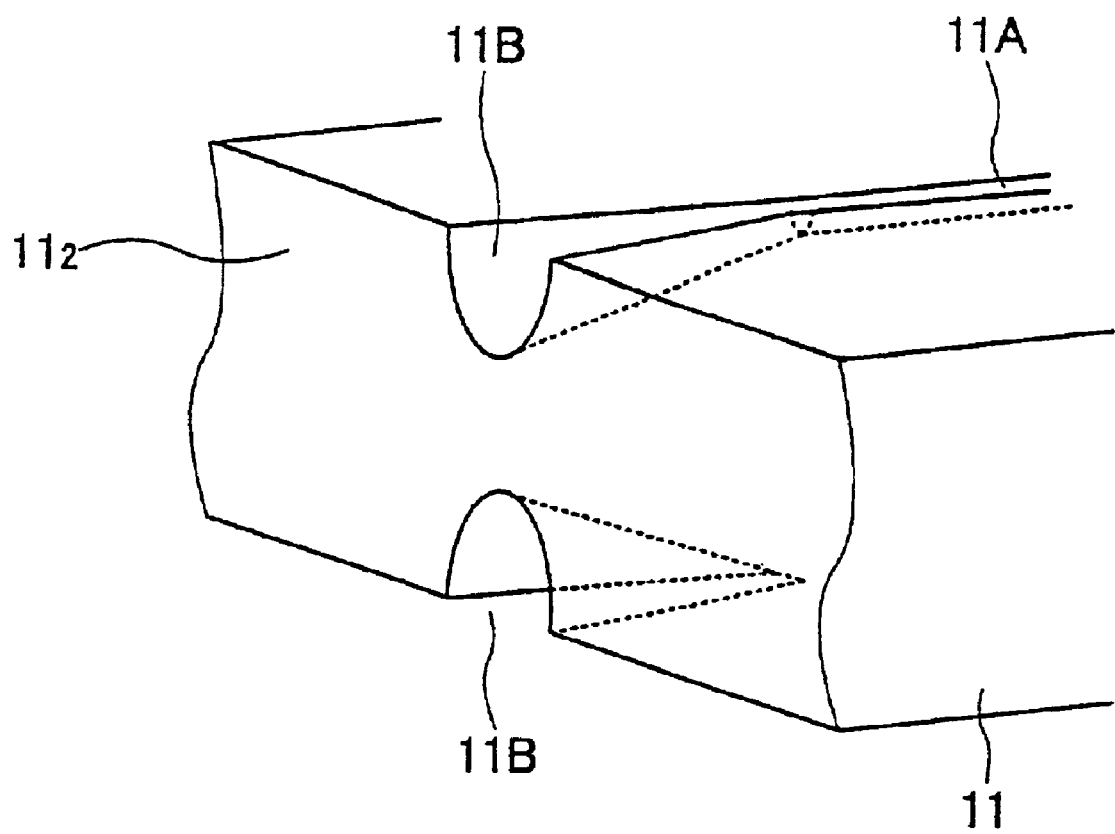
FIG. 5 is a perspective view showing an optical wiring connection structure according to a second embodiment of the present invention.

FIG. 5 is an enlarged perspective view of the end face $11_2$ of the substrate 11 in an optical wiring connection structure according to a second embodiment of the present invention. In FIG. 5, parts already explained are given the same reference numerals, and description thereof will be omitted.

Figure 6:
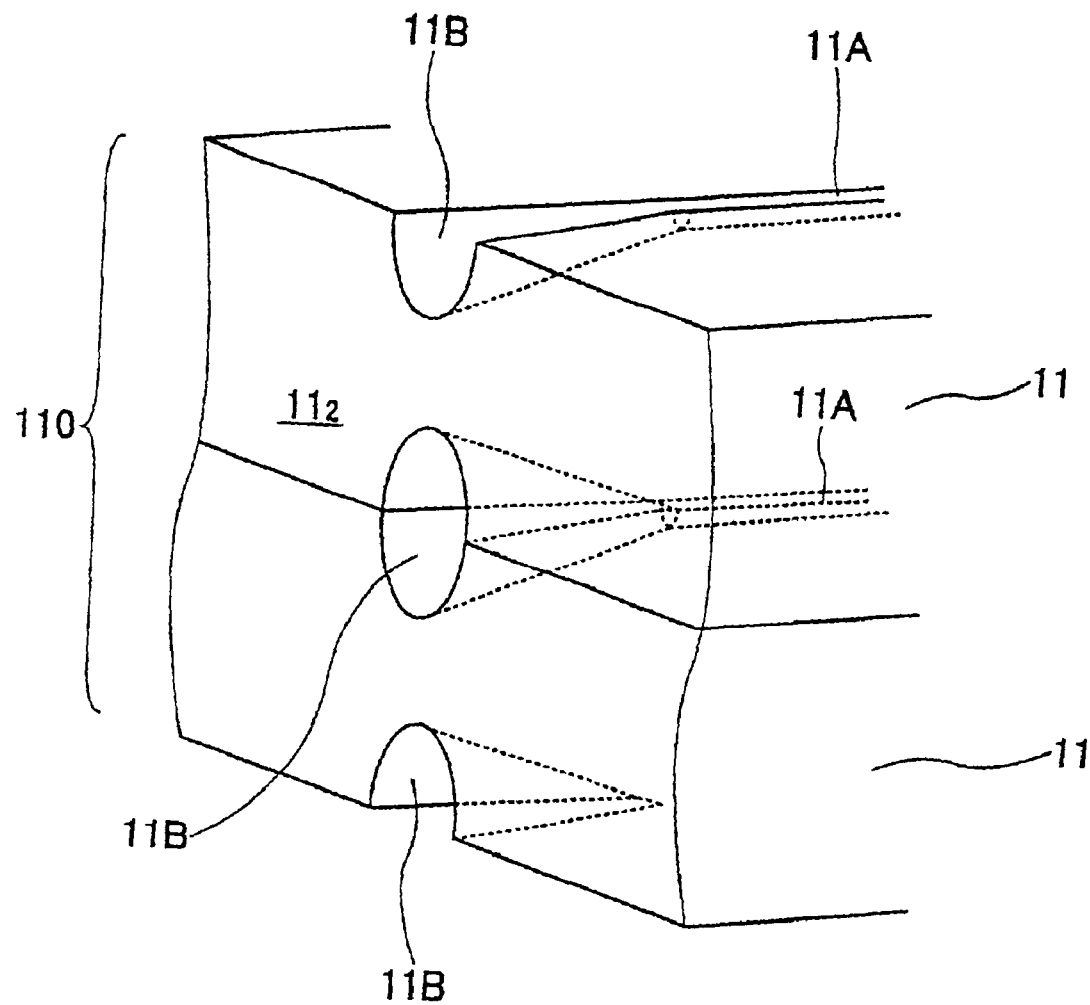
FIG. 6 is another perspective view showing the optical wiring connection structure according to the second embodiment of the present invention.

Referring to FIG. 5, in this embodiment, an opening of each of the grooves 11A in the end face $11_2$ forms a tapered part 11B. Therefore, when stacking the substrate 11 to form the stacked material 110, an opening with a large diameter corresponding to the tapered part 11B is formed on the end face $11_2$ as shown in FIG. 6.

When connecting such stacked materials 110 and 130, it is generally inescapable that misregistrations occur between grooves connected to each other. When such misregistrations occur and the narrow grooves 11A are extended to the end face $11_2$ of the substrate 11, the optical fibers 12A penetrating the stacked materials 110 and 130 are sharply bent at the joint surface of the substrates 11 and 13. Accordingly, a problem occurs that optical loss increases.

On the other hand, as shown in FIG. 5, by widening the width of grooves to the direction of joint surface, even when the misregistrations occur between the substrates 11 and 13, it is possible for the optical fiber 12A to penetrate the stacked material 130 without increasing the optical loss.

As shown in FIG. 5, it is preferable to provide such a tapered part 11B on the other side of the substrate 11 as well.

When forming the stacked material 110 by stacking the substrates 11 where the tapered parts 11B are provided on both sides, it is possible for the optical fibers 12A laid in grooves 11A to absorb the misregistrations in arbitrary directions.

Further, it is not necessary that the tapered part 11B is conical as shown in FIGS. 5 and 6. The tapered part 11B may be also pyramidic.

[Third Embodiment]

Figure 7:
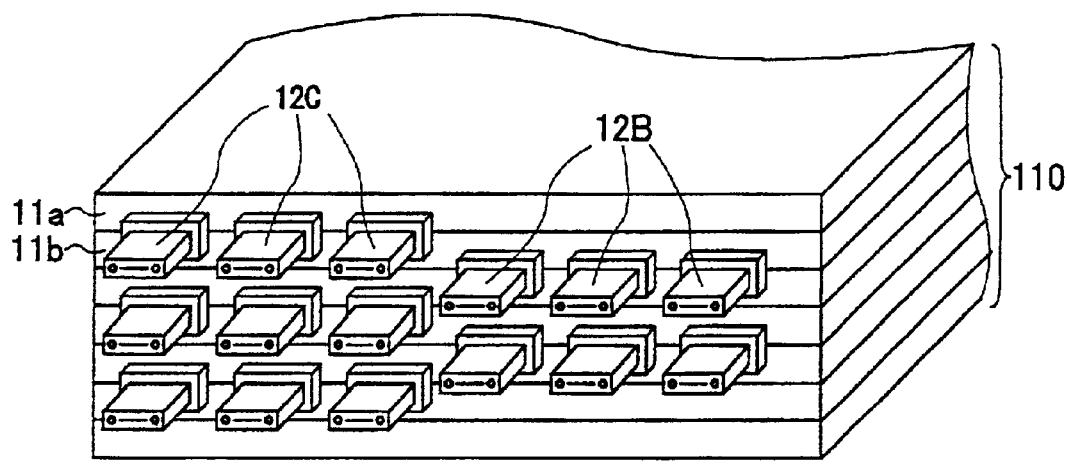
FIG. 7 is a perspective view showing an optical wiring connection structure according to a third embodiment of the present invention.

FIG. 7 is an enlarged perspective view of a part of an optical wiring connection structure according to a third embodiment of the present invention, to which part optical connectors 12B and 12C are provided. The parts already explained are given the same reference numerals, and description thereof will be omitted.

Referring to FIG. 7, in this embodiment, the optical connectors 12B and 12C are integrally formed with the stacked material 110.

In this embodiment, three optical connectors 12C on a substrate 11a and three optical connectors 12B on a substrate 11b coming in contact with the substrate 11a are positioned alternately when seen from a direction vertical to a principle plane of the board. Herewith, the grooves formed in the substrate 11 are positioned alternately in adjacent substrates.

In the structure shown in FIG. 7, the optical connectors 12C and 12B having the thickness of approximately 3 mm do not align with each other along a vertical line. For this reason, the thickness of the stacked material 110 can be decreased.

Figure 8:
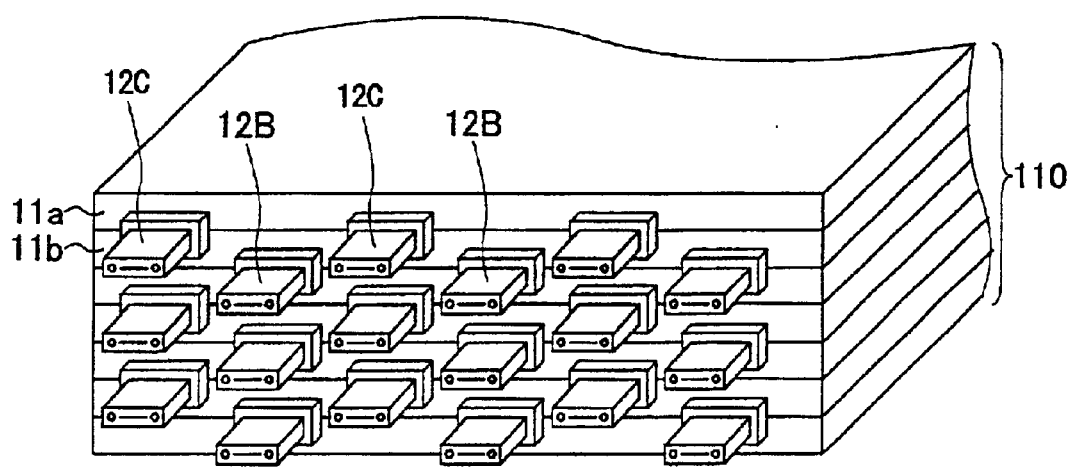
FIG. 8 is another perspective view showing the optical wiring connection structure according to the third embodiment of the present invention.

Further, this embodiment is not limited to the structure shown in FIG. 7. As shown in FIG. 8, the optical connectors 12C and 12B may be arranged alternately one by one.

The present invention is not limited to the specifically disclosed embodiments, and variations and modifications may be made without departing from the scope of the present invention.

The present application is based on Japanese priority application No. 2001-323842 filed on Oct. 22, 2001, the entire contents of which are hereby incorporated by reference.

What is claimed is:

1. An optical wiring connection structure comprising;
   a first optical wiring connection part including a first board constituted by a plurality of substrates and having a first end and a second end, a plurality of first through-holes continuously extending from said first end to said second end in each of the plurality substrates of said first board;
   a second optical wiring connection part including a second board constituted by a plurality of substrates and including a third end and a fourth end and positioned such that said third end connects with said second end of said first boards, a plurality of second through-holes continuously extending from said third end to said fourth end in each of the plurality substrates of said second board;
   a plurality of optical wires each of which is provided in a respective one of said first through-holes so as to extend from said first end to said second end, and further extend continuously in a respective one of said second through-holes corresponding to said first through-holes from said third end to said fourth end;
   a first optical connector that is provided to each of said substrates of said first board and connected with optical fibers extending from said first end; and
   a second optical connector that is provided to each of said substrates of said second board and connected with optical fibers extending from said fourth end,
   wherein said second board is positioned such that each board surface is orthogonal to each board surface of a plurality of said substrates of said first board, and
   said second board is provided such that each of said through-holes corresponds to respective one of a plurality of said first through-holes exposed at said second end.

2. The optical wiring connecting structure as claimed in claim 1, wherein said optical wires are formed with a pitch at said second end greater than a pitch at said first end, and with a pitch corresponding to a thickness of the substrate of said first board at said third end.

3. The optical wiring connection structure as claimed in claim 1, wherein said optical wires are formed with a pitch at said fourth end smaller than a pitch at said third end.

4. The optical wiring connection structure as claimed in claim 1, wherein in said first and second optical wiring connection parts, said optical wires are formed so as not to overlap with each other when seen in a direction perpendicular to a principle plane of a corresponding one of the first and second boards.

5. The optical wiring connection structure as claimed in claim 1, wherein a first part of said optical wires extending from said first end are provided with the first optical connector, and a second part of said optical wires extending from said fourth end are provided with the second optical connector.

6. The optical wiring connection structure as claimed in claim 1, wherein in said second end, a plurality of said optical wires are formed with a pitch corresponding to a thickness of the substrate of said second board.

7. The optical wiring connection structure as claimed in claim 1, wherein said optical wires are composed of optical fibers.

8. The optical wiring connection structure as claimed in claim 1, wherein said board is constituted by a plurality of substrates in which grooves corresponding to said through-holes are formed.

9. The optical wiring connection structure as claimed in claim 1, wherein said through-holes are formed with a first pitch at said first end, and with a second pitch at said second end, the second pitch being greater than the first pitch.

10. The optical wiring connection structure as claimed in claim 1, wherein said through-holes are formed with a first pitch at said first end, and with a second pitch at said second end, the second pitch being different from the first pitch.

11. The optical wiring connection structure as claimed in claim 1, wherein a diameter of each of said through-holes increases at said second end.

12. The optical wiring connection structure as claimed in claim 1, wherein said board is formed of one of plastic, metal and ceramics.

* * * * *